(12) United States Patent
Kuo

(10) Patent No.: US 7,674,422 B2
(45) Date of Patent: Mar. 9, 2010

(54) REINFORCED THIN-SHELL MOLDS

(75) Inventor: Eric Kuo, Foster City, CA (US)

(73) Assignee: Align Technology, Inc., Santa Clara, CA (US)

( * ) Notice: Subject to any disclaimer, the term of this patent is extended or adjusted under 35 U.S.C. 154(b) by 169 days.

(21) Appl. No.: 11/775,655

(22) Filed: Jul. 10, 2007

(65) Prior Publication Data

US 2009/0014907 A1 Jan. 15, 2009

(51) Int. Cl.
*B29C 35/08* (2006.01)

(52) U.S. Cl. .............. 264/401; 264/308; 264/113; 264/497; 425/375; 425/174.4

(58) Field of Classification Search ........... 264/219, 264/220, 175, 401, 208, 113, 497; 425/375, 425/174.4

See application file for complete search history.

(56) References Cited

U.S. PATENT DOCUMENTS 5,824,260 A * 10/1998 Sauerhoefer ............... 264/401
2003/0011106 A1 * 1/2003 Osaki ....................... 264/401

* cited by examiner

*Primary Examiner*—Kat Wyrozebski
*Assistant Examiner*—Robert J Grun
(74) *Attorney, Agent, or Firm*—Klein, O'Neill & Singh, LLP

(57) ABSTRACT

A method and a system for forming a polymeric resin mold for molding plastic items, wherein the method includes: (a) using a rapid-prototyping process to create a polymeric resin shell having a configuration in the form of the mold; (b) introducing a reinforcing material into the shell; and (c) curing the shell. The system includes a rapid-prototyping apparatus that creates a plurality of the polymeric resin shells on a platform; a reinforcing material introduction apparatus that introduces a reinforcing material into each of the shells while the shells are on the platform to form a plurality of uncured molds on the platform; and a curing apparatus that cures the shells while they are on the platform.

20 Claims, 5 Drawing Sheets

REINFORCED THIN-SHELL MOLDS

CROSS-REFERENCE TO RELATED APPLICATIONS

Not Applicable

FEDERALLY SPONSORED RESEARCH OR DEVELOPMENT

Not Applicable

BACKGROUND OF THE INVENTION

This disclosure relates to the fabrication of polymeric resin molds used to form molded plastic items. More specifically, it relates to the fabrication of polymeric resin molds made by a rapid prototyping process.

Molded plastic orthodontic alignment appliances ("aligners") and their method of manufacture as mass-fabricated custom items are disclosed, for example, in U.S. Pat. No. 5,975,893 and US Patent Application Publication 2005/0082703, both of which are commonly assigned to the assignee of the subject invention, and the complete disclosures of which are both incorporated herein by reference. Plastic orthodontic appliances, of the type disclosed in the above-referenced documents, are made as a set of incremental position adjustment appliances that are used to realign or reposition a patient's teeth. The series of incremental position adjustment appliances is custom made for each patient during the fabrication process.

The appliances are typically made by thermal-forming a piece of plastic over a unique mold that represents an incremental position to which a patient's teeth are to be moved, which position corresponds to a particular incremental position adjustment appliance. The unique molds are manufactured by downloading digitized representations of three-dimensional CAD models of the molds to a rapid prototyping ("RP") apparatus, such as, for example, stereolithography apparatus ("SLA") or photolithography apparatus ("PLA"). Because each aligner is associated with a unique mold on which the aligner is fabricated, for the purposes of this disclosure, the molds themselves are considered to be mass-fabricated custom items.

The molding process requires that the molds have substantial structural rigidity and strength, thereby allowing them to withstand the pressures and stresses of the molding process without deformation. Thus, the molds have typically been made as solid forms, each of which is a three-dimensional model or replica of a patient's dental arch at a particular stage of treatment. The use of solid forms has two distinct disadvantages: (1) It requires the use of a considerable amount of polymeric resin material, which is expensive; and (2) because the RP machine builds the molds up layer by layer, the greater the volume of material used in each layer, the longer it takes to form each layer. To save on material costs, the completed molds may be hollowed out or "shelled" before they are cured, and the material removed for re-use. There is a limit, however, to the amount of material that can be removed without degrading the structural integrity of the molds, and the shelling process itself is costly and time-consuming. Thus, the conventional process for forming the RP molds is costly, both in the expense of the material and in production time and costs.

It would thus be advantageous to provide a method of making polymeric resin molds, such as SLA molds, that can create molds with sufficient strength and rigidity to be used in the subsequent molding process, and that can do so while reducing both the amount of polymeric resin material and the fabrication time needed to make the molds.

SUMMARY OF THE INVENTION

As used herein, the terms "the invention" and "the present invention" encompass the invention disclosed herein in its various aspects and embodiments as well as any equivalents that may reasonably suggest themselves to those skilled in the pertinent arts.

Broadly, the present invention is a method and a system for forming a polymeric resin mold for molding plastic items, wherein the method includes, and the system performs, the steps of: (a) using a rapid-prototyping process to create a polymeric resin shell having a configuration in the form of the mold; (b) introducing a reinforcing material into the shell; and (c) curing the shell.

DETAILED DESCRIPTION OF THE INVENTION

Figure 1:
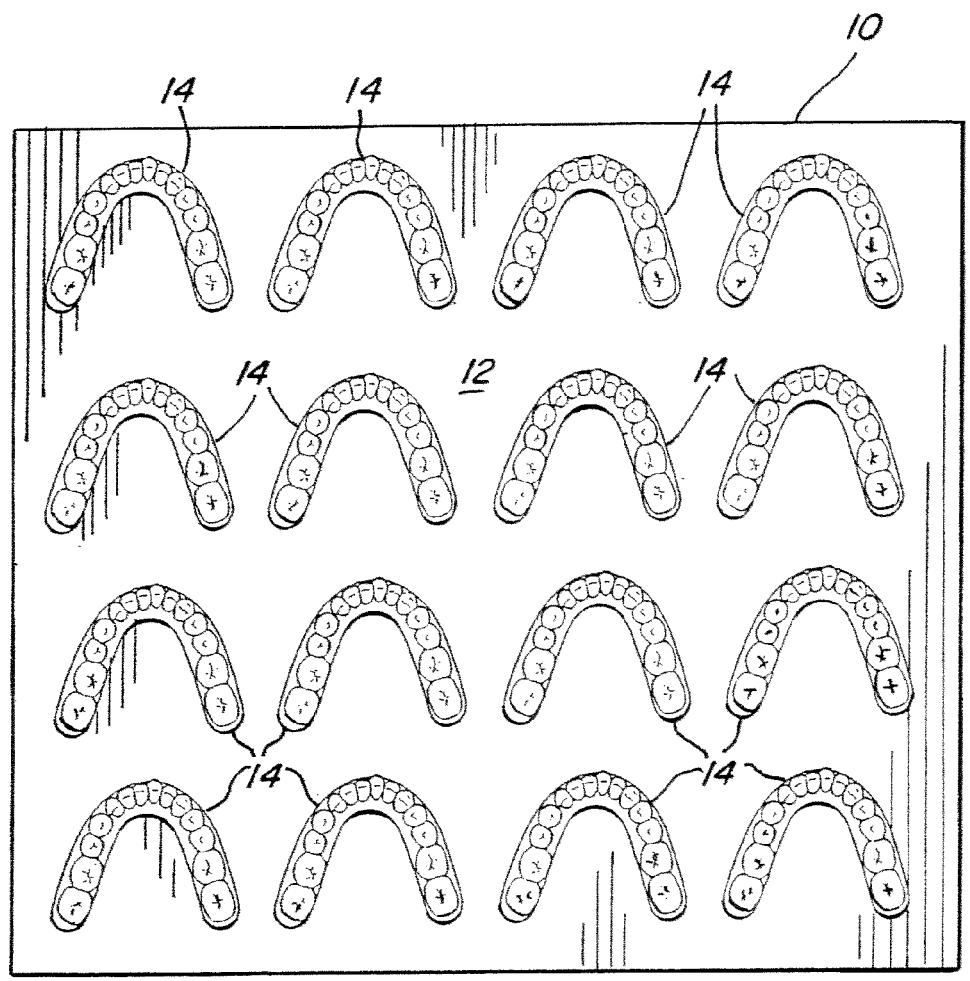
FIG. 1 is a top plan view of a platform or tray on which a plurality of hollow polymeric resin mold shells have been formed by a rapid-prototyping process in a rapid-prototyping apparatus.

Referring now to the drawings, FIG. 1 shows a tray or platform 10, having a top or upper surface 12 on which a plurality of polymeric resin mold shells 14 are formed by a conventional rapid-prototyping process, such as stereolithography (SLA), in a rapid-prototyping apparatus. The mold shells 14 are shown in the form of molds for orthodontic aligners, but they may be configured for molding any desired plastic item. If the mold shells 14 are made by the SLA process, they are built up, layer by layer, on the surface 12 of the platform 10 in an SLA apparatus.

Figure 2:
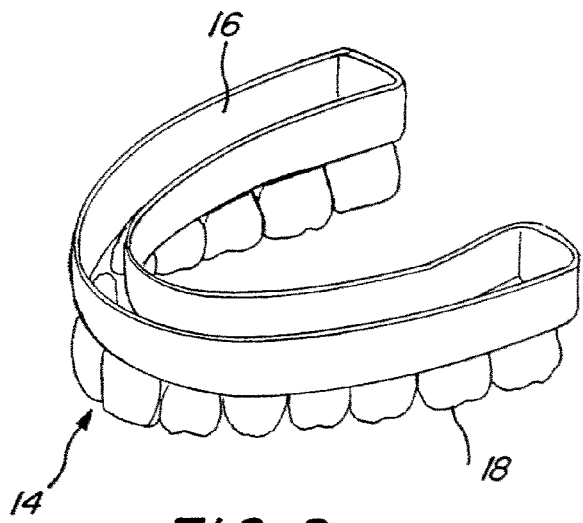
FIG. 2 is a bottom perspective view of a single mold shell as formed on the tray of FIG. 1 in accordance with a first embodiment of the invention.

An array of predefined mold locations is defined on the top surface 12 of the platform 10, and each of the mold shells 14 is formed at one of the predefined mold locations, all of the mold shells 14 being formed simultaneously at their respective mold locations. An exemplary mold shell 14, in accordance with a first embodiment of the invention, is shown in FIG. 2. The mold shell 14 has a hollow interior 16 and an exterior surface 18 in the configuration of the molded plastic part (in this case, an orthodontic aligner, not shown) to be formed on the mold.

In the case of mass-customized items such as orthodontic aligners, each mold shell 14 is formed in accordance with the information in a unique treatment file that identifies the patient, the stage, the associated 3D CAD model, and whether the mold shell is of the upper or lower dental arch. The treatment file for each mold to be formed on the platform 10 is stored in a computer database that may be accessed by the rapid prototyping ("RP") apparatus either directly or through a local area network (LAN) or any other computer networking system that provides the needed functionality. In such an application, it is advantageous for each mold shell 14 to be formed at a predetermined corresponding mold location on the platform 10. The specific mold location at which each mold shell 14 is formed may be either pre-assigned or tracked (after assignment) by the computer system (not shown) containing the database, and the specific mold location of each mold shell 14 is stored in the database.

Figure 4:
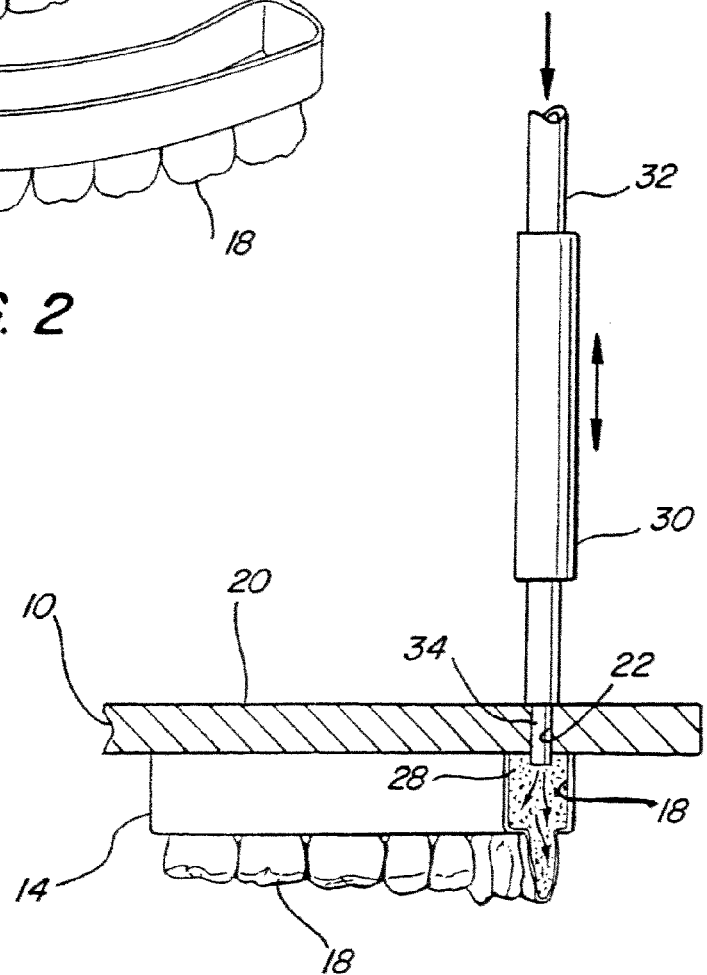
FIG. 4 is a side elevational view, partly in cross-section, showing the introduction of a reinforcing material into the hollow interior of a mold shell of the type shown in FIG. 2, in accordance with the first embodiment of the invention.
Figure 3:
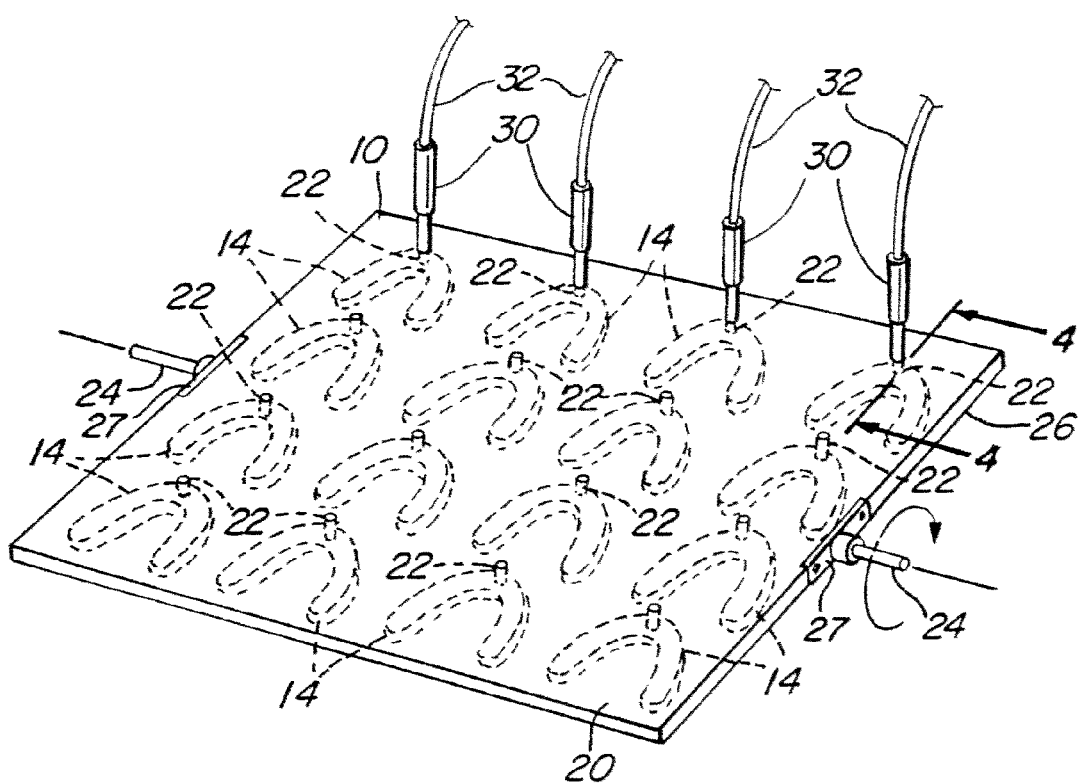
FIG. 3 is perspective view showing the bottom of the tray of FIG. 1, and showing also the apparatus for introducing a reinforcing material into the hollow interior of a mold shell, in accordance with a first embodiment of the invention.

After completion of the RP process (e.g., stereolithography or photolithography), the tray or platform 10, with the mold shells 14 formed on its upper surface 12, is now accessed by a reinforcing material introduction apparatus, whereby a reinforcing material is introduced into the interior of the mold shells 14. The reinforcing material introduction apparatus, an exemplary embodiment of which is shown in FIGS. 3 and 4, may be incorporated in, or be otherwise associated with, the RP apparatus, or it may be at a separate location, in which case the platform 10 is moved (e.g., by a conveyor, not shown) to the reinforcing material introduction apparatus. The mold shells 14 are too thin and fragile to be removed from the platform 10, so the reinforcing material must be introduced while the shells 14 are still on the platform 10. In the embodiment illustrated in FIGS. 3 and 4, the platform 10 has a bottom surface 20 and an array of apertures 22 that extend through the platform 10 from the bottom surface 20 to the top surface 12. Each of the above-mentioned mold locations is located so as to coincide with and be accessed by one of the apertures 22.

The exemplary reinforcing material introduction apparatus, as shown in FIG. 3, is advantageously configured to allow the platform 10 to be rotatably mounted to permit the inversion of the top surface 12 and the bottom surface 20. To this end, one end of a rotatable shaft 24 may be releasably attachable to a side edge 26 of the platform 10 by an attachment mechanism, such as a clamp 27. Preferably, a rotatable shaft 24 may be releasably fixed, by a clamp 27, to each of two opposite side edges 26, as shown in FIG. 3. Alternatively, the platform 10 may be clamped or otherwise releasably secured to a rotatable bed (not shown) to which the shaft or shafts 24 may be fixed. The shaft or shafts 24 may be rotated by an electric motor (not shown) or any other conventional means, controlled to rotate the shaft or shafts 24 so as to flip the platform 10 to its upside-down position (FIG. 3) when the filling step is ready to commence. The resin from which the mold shells 14 are formed adheres to the top surface 12 of the platform 10, thereby allowing the platform 10 to be inverted while the mold shells 14 remain adhered to its top surface 12.

In accordance with a first embodiment of the invention, a reinforcing material 28 (FIG. 4) is introduced into the hollow interior 16 of each of the mold shells 14 by a nozzle 30 that is connected by a hose or line 32 to a source (not shown), such as a tank, container, or other receptacle, containing the reinforcing material. The nozzle 30 has a distal tip 34 configured to fit into the tray aperture 22, and the nozzle itself is movable vertically between a lower or filling position in which the tip 34 is inserted in the aperture 22, and a raised or stand-by position in which the tip 34 is out of the aperture 22. The material 28 is introduced from the bottom surface 20 of the platform 10 after the platform has been inverted, so that the reinforcing material 28 is introduced directly into the hollow interior 16 of each mold shell 14 through the aperture 22 that registers with the mold location 15 at which the shell 14 has been formed. As shown in FIG. 3, there is advantageously provided a plurality of nozzles 30 arranged to address, simultaneously, a row of mold shells 14. Alternatively, a plurality of nozzles 30 may be provided in an array corresponding to the array of mold locations on the platform 10, so that there is a separate nozzle for each of the mold shells 14 on the platform 10.

The reinforcing material 28 may be a conformal filling material, such as, for example, a liquid plastic resin (e.g., urethane, ABS, PVC, or epoxy), or it may be a plastic foam, such as urethane, polyurethane, styrene, or polystyrene. Foams advantageous, because they can expand to fill the interior volume of the shell 14, and because they are more easily cut after curing than is a hardened plastic resin, making the trimming of the molds easier. On the other hand, epoxies have the advantage that even a relatively thin coating of epoxy, sprayed into the shell interior by a modified form of the nozzles 30, may, after curing, provide sufficient structural strength and rigidity to the shell to withstand the molding pressures to which it will be subjected, as described above.

Alternatively, the reinforcing material 28 may be a non-resin bulk material, such as plaster, cement, or a silicone-based putty or gel, which is cured by simply by drying. An advantage of a silicone-based putty or gel is that a volume of such substance substantially less than the interior volume of the shell may lend sufficient rigidity and strength to the shell for the above-described molding process. Still another alternative for the reinforcing material 28 is a material with a temperature-dependent viscosity; i.e., a material that is a liquid when heated to an elevated temperature, and that thickens to a highly-viscous semi-liquid or paste when cooled to ambient ("room") temperature. Examples of such materials are waxes (both petroleum-based and "natural," such as beeswax), and certain plastic resins, such as "HYDROPLASTIC" brand thermoplastic, available from TAK Systems, of Wareham, Mass.

If the reinforcing material 28 is a conformal filler material, as shown, for example, in FIG. 4, it is injected into each shell 14 so as to substantially fill the volume of the hollow interior 16 of the shell 14. The injected volume can be a fixed volume that is substantially the same for each shell, or it can be varied from shell to shell. The fixed volume may be derived from a predetermined average shell volume value that can be stored in the memory of a computer system (not shown) that controls the mold manufacturing process, and particularly the shell filling step of that process. Alternatively, the nozzles 30 can be mechanically designed and/or controlled to inject the same predetermined volume of filler material 28 into all of the mold shells 14. Using the average shell volume value for all of the shells is advantageous when a plastic foam is used as the filler material, since the foam expands to fill the available space in the shell interior, and thus precisely measuring the volume of foam delivered to match the interior volume of the shell is not needed.

Alternatively, the volume of a conformal filler material 28 injected into each shell 14 can be adjusted to the approximate interior volume of that shell. This method may be advantageous if a liquid resin is used as the filler material, since the delivered volume of the filler material must be approximately the same as the interior volume of the shell, and the interior shell volume can vary significantly from shell to shell. This method of filling can be accomplished by retrieving a stored volume value from the aforementioned database, which, as mentioned above, includes a treatment file for the custom mold to be made from each of the shells 14. This treatment file can be updated with the calculated interior volume for each shell, and since the database includes a specific location on the platform 10 for each of the shells 14, the nozzles 30 can be controlled by the computer system to deliver or inject into each shell the appropriate volume of filler material in accordance with the volume value retrieved from the treatment file or another file or location in the database.

As still another alternative, as mentioned above, certain reinforcing materials (e.g., certain epoxies and silicone-based fillers), may require a relatively fixed volume, either because they need only be applied as a relatively thin coating layer on the interior surface of the shells 14, or a volume that is substantially less than the average interior volume of the shells. The nozzles 30 and the mechanism for controlling the volume of reinforcing material delivered may be readily modified for such applications, as will be apparent to those skilled in the pertinent arts.

After the reinforcing material has been introduced into the interior of the mold shells 14, as described above, the reinforced shells 14 (which now may be considered uncured molds) are then accessed by a curing apparatus to cure the mold shells 14. The curing apparatus may be incorporated in, or otherwise associated with, the reinforcement material introduction apparatus, or it may be at a different location, in which case the platform 10 is moved (e.g., by a conveyor, not shown) from the reinforcement material introduction apparatus to the curing apparatus. Typically, the resin used to form the shells 14 is UV-cured, as is well known. If the reinforcing material 28 is of a type that requires curing, it may be cured at this point in the process as well. Depending on the particular type of reinforcing material used, its curing may be accomplished by chemical reaction, cooling, thermosetting, UV setting, or dehydration. (For the purpose of this description, the term "curing," as applied to the reinforcing material 28, includes curing, setting, or hardening by any of the aforementioned processes, or any other equivalent processes, as appropriate for the particular material used.) Alternatively, the shells 14 may be UV-cured before the reinforcing material 28 is introduced, in which case the curing step performed after the introduction of the reinforcing material 28 will involve the curing or setting of the reinforcing material 28 only. After curing, the reinforced mold shells 14 (now cured molds) are separated from the platform 10 for cleaning, trimming, and other processing preparatory to being used to mold the plastic items (e.g., aligners).

Figure 5:
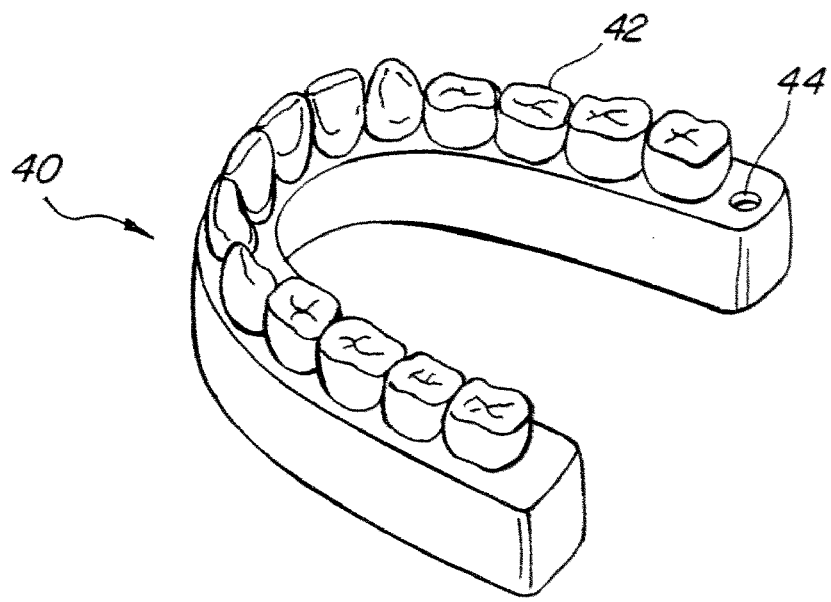
FIG. 5 is a top perspective view of a single mold shell in accordance with a second embodiment of the invention.
Figure 6:
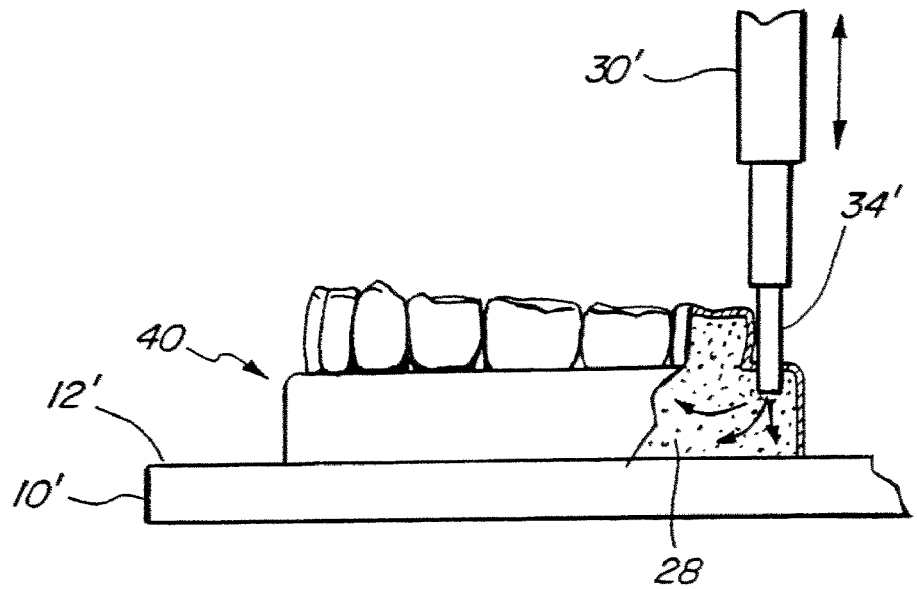
FIG. 6 is a side elevational view, partly in cross-section, showing the introduction of a reinforcing material into the hollow interior of a mold shell of the type shown in FIG. 5, in accordance with the second embodiment of the invention.

An alternative procedure for introducing a reinforcing material, as used in a second embodiment of the invention, is illustrated in FIGS. 5 and 6. A mold shell 40, as used in the second embodiment of the invention, has a hollow interior (not shown) and an exterior surface 42 configured as the item to be molded thereon. The mold shell 40 also has a filler hole 44 communicating with the hollow interior. As in the above-described first embodiment, a plurality of mold shells 40 is formed on the top surface 12' of a tray or platform 10', each of the shells 40 being formed in a specific, predetermined mold location on the top surface 12'. The platform 10' in this embodiment, unlike that of the above-described first embodiment, need not be rotatable in the reinforcement material introduction apparatus, as each of the mold shells 40 is at least partially filled with the reinforcing material 28 by a vertically translatable injection nozzle 30' with a distal tip that is insertable from the shell's exterior surface 42 through the filler hole 44 and into the shell's interior while the mold shells 40 are maintained in their normal orientation (i.e., "right-side up"). In all other material aspects, the second embodiment of the invention is essentially the same as the above-described first embodiment.

Figure 7:
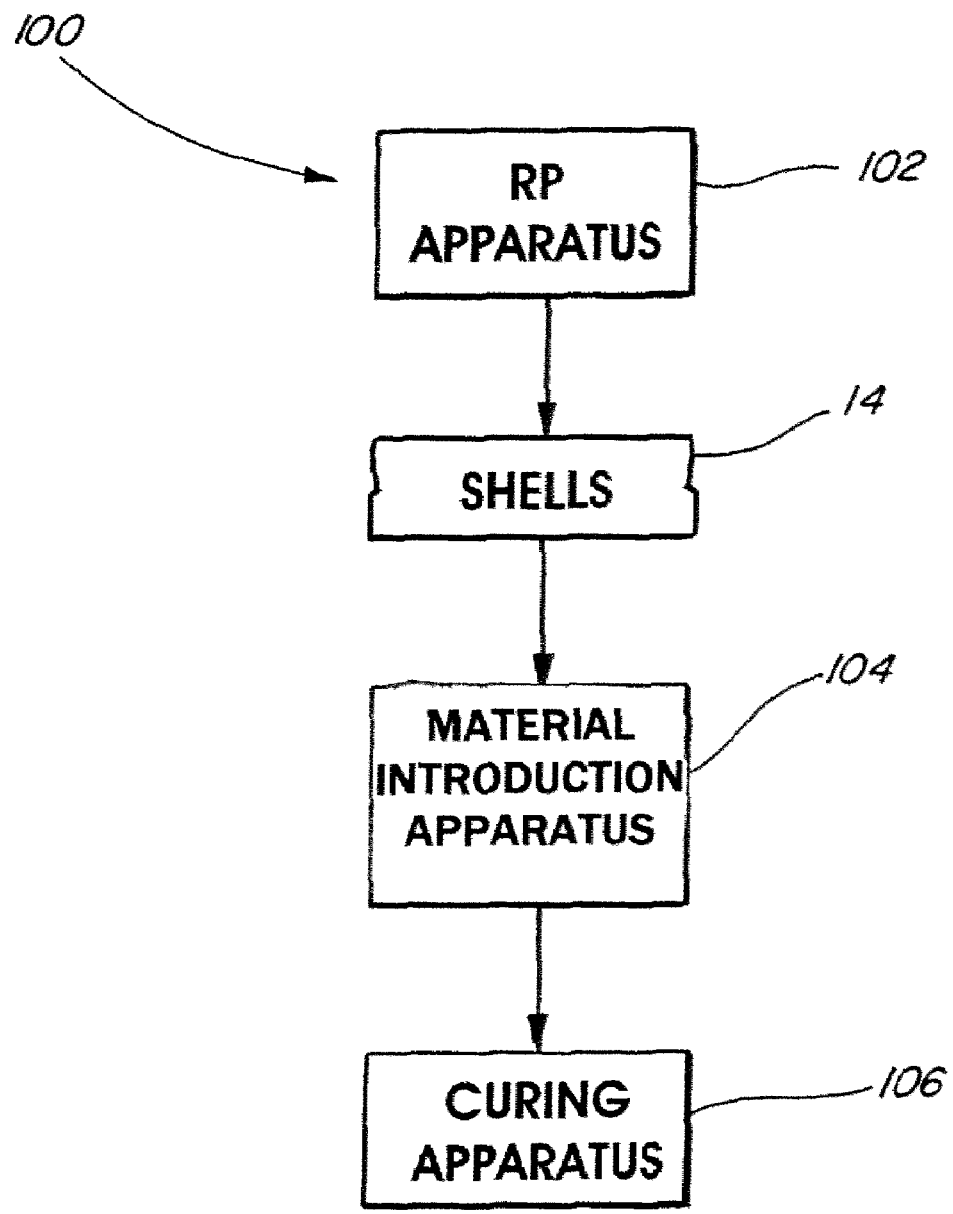
FIG. 7 is a diagrammatic representation of a system for forming polymeric resin molds in accordance with the invention.

FIG. 7 illustrates diagrammatically a system 100 for carrying out the above-described process. First, as mentioned above, a rapid-prototyping apparatus 102 is employed to form the polymeric resin mold shells 14 or 40 on the platform or tray 10 or 10' by a rapid-prototyping process, such as stereolithography or photolithography. The tray or platform carrying the mold shells is then accessed by a reinforcing material introduction apparatus 104, as described above and as shown in FIGS. 3 and 4, and (in an alternate form) in FIG. 6, by which the reinforcing material is introduced into the interior of the hollow shells 14 or 40 to form a plurality of uncured molds on the platform. Finally, the tray or platform carrying the reinforced mold shells (uncured molds) is accessed by a curing apparatus 106, such as, for example, a UV curing apparatus, as is well-known in the art. Alternatively, the curing apparatus may cure the molds by chemical reaction, thermosetting, or dehydration. After the curing process, the cured and hardened molds may safely be removed from the platform for further processing as needed or desired.

As mentioned above, the shells may be cured before being filled, and then subject to the curing process for the purpose of curing the reinforcing material. In that case, the shells are accessed by the curing apparatus 106 (or another curing apparatus of the same or different type, depending on the materials to be cured) before being accessed by the reinforcing material introduction apparatus 104, and then the reinforced shells (uncured molds) are accessed by a curing apparatus (e.g., the curing apparatus 106) a second time for curing the reinforcing material.

While preferred embodiments of the invention are described above and are illustrated in the drawings, it is understood that these embodiments are exemplary only as the currently preferred embodiments of the invention. It will be appreciated that a number of variations and modifications will suggest themselves to those skilled in the pertinent arts. Such variations, modifications, and equivalents should be considered within the spirit and scope of the invention, as defined in the claims that follow.

What is claimed is:

1. A method of making a plurality of polymeric resin molds, comprising:
    (a) providing a platform having a top surface defining an array of predefined mold locations, a bottom surface, and a plurality of filling apertures extending from the bottom surface to the top surface, wherein each of the mold locations registers with and is accessed by at least one of the filling apertures;
    (b) forming a plurality of polymeric resin mold shells on the top surface of the platform using a rapid prototyping process, each of the mold shells being formed at one mold location of the array of the predefined mold locations;
    (c) introducing a reinforcing material into each of the mold shells by delivering the reinforcing material through the filling apertures; and
    (d) curing the mold shells.

2. The method of claim 1, wherein the liquid polymeric resin is selected from the group consisting of at least one of urethane, ABS, PVC, and epoxy.

3. The method of claim 1, wherein the curing step includes the step of setting the resin of the reinforcing material by a method selected from the group consisting of chemical reaction setting, thermosetting, dehydration, and UV setting.

4. The method of claim 1, wherein the rapid-prototyping process is selected from the group consisting of stereolithography and photolithography.

5. The method of claim 4, wherein the rapid prototyping process is a stereolithography process.

6. The method of claim 1, wherein the reinforcing material is selected from the group consisting of cement, plaster, silicone-based putty, and silicone-based gel.

7. The method of claim 1, wherein the reinforcing material is a material that is a liquid when heated to an elevated temperature, and that increases in viscosity to a semi-liquid or paste when cooled to ambient temperature.

8. The method of claim 1, wherein the shell has an interior surface, wherein the reinforcing material is an epoxy, and wherein the step of introducing the reinforcing material is performed by applying the epoxy to the interior surface of the shell.

9. The method of claim 1, wherein each of the mold shells is formed with a filler hole, and wherein the step of introducing the reinforcing material into the mold shells includes the step of delivering the reinforcing material through the filler hole.

10. The method of claim 1, wherein the step of delivering the reinforcing material includes the step of injecting the reinforcing material into the filling apertures from the bottom surface of the platform.

11. The method of claim 10, wherein the step of introducing the reinforcing material includes:
   providing a plurality of nozzles operable to inject the reinforcing material;
   inserting the nozzles into the filling apertures through the bottom surface; and
   injecting the reinforcing material from the nozzles into the filling apertures.

12. The method of claim 1, wherein the reinforcing material includes a liquid polymeric resin, and wherein the filling step includes the further step of curing the resin of the reinforcing material.

13. The method of claim 1, wherein the reinforcing material is a plastic foam material.

14. The method of claim 13, wherein the foam material is selected from the group consisting of at least one of urethane, polyurethane, styrene, and polystyrene.

15. The method of claim 1, wherein the step of introducing the reinforcing material includes the step of filling the shell with a volume of reinforcing material that is approximately equal to the internal volume of the shell.

16. The method of claim 15, wherein the internal volume of the shell is determined from a volume value calculated as an average shell volume value.

17. The method of claim 15, wherein the internal volume of the shell is determined by retrieving a stored volume value from a database.

18. The method of claim 17, wherein the internal volume of each shell is stored as a volume value in the database.

19. The method of claim 1, wherein the step of curing the mold shells is performed before the step of introducing the reinforcing material into the mold shells.

20. The method of claim 1, wherein each of the plurality of the polymeric resin mold shells formed in the forming step has a unique configuration.

* * * * *